No. 814,161. PATENTED MAR. 6, 1906.
A. PEUST.
ELASTIC METALLIC TIRE.
APPLICATION FILED FEB. 20, 1905.
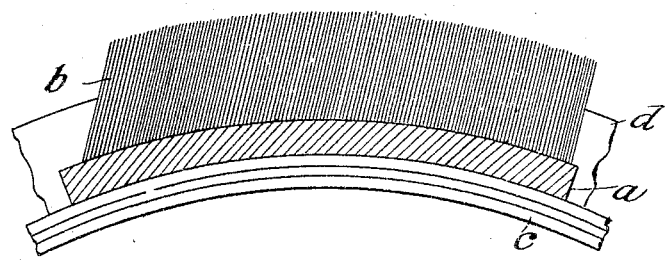
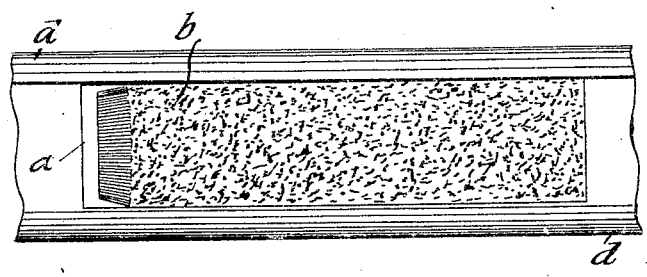
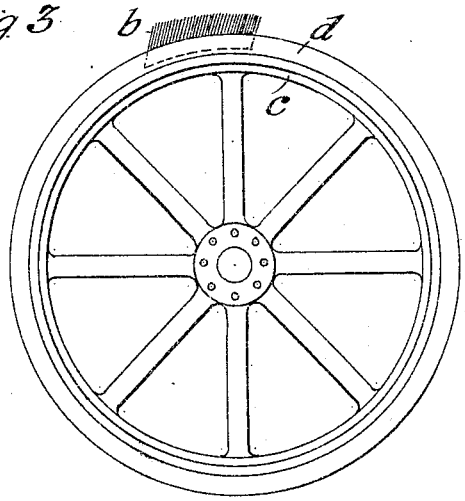
Witnesses
Inventor
Albert Peust
by his Attorney

UNITED STATES PATENT OFFICE.

ALBERT PEUST, OF HANOVER, GERMANY.

ELASTIC METALLIC TIRE.

No. 814,161.  Specification of Letters Patent.  Patented March 6, 1906.

Application filed February 20, 1905. Serial No. 246,488.

*To all whom it may concern:*

Be it known that I, ALBERT PEUST, a subject of the German Emperor, and a resident of Hanover, in the Kingdom of Prussia and the Empire of Germany, have invented a new and useful Elastic Metal Tire for Wheeled Vehicles of All Kinds for Ordinary Roads, of which the following is a specification.

This invention consists in an improved elastic tire for vehicles of all kinds for ordinary roads in which the running-surface is formed of metal wires.

In the accompanying drawings, in which similar letters refer throughout to similar parts, Figure 1 is a front longitudinal section of part of a tire made according to my invention; Fig. 2, a plan view thereof, and Fig. 3 a wheel partly tired according to my system.

The elastic metal tire consists, first, of a structure similar to a stiff circular brush formed of steel wires $b$, set in a firm under layer $a$, which surrounds and fits in the rim of the wheel. The wires are not radial to the wheel, but lie somewhat inclined to the radii or spokes; but this inclination is in the plane of the wheel. The result of this inclination from the radial position is that the wires $b$ which go to make up the tire always lean in one direction, whether the wheel is standing still or running and under light or heavy load, and thereby continually support each other, and there is attained a limited flexibility and elasticity. Further, the wheel-tread retains a regular form.

In order to attain a certain degree of lateral "give" on curves or in case the vehicle receives sudden severe jars or blows, to relieve the steel strips $b$ these last are protected on each side by a ring $d$, of suitable elastic material, which can be attached to and lie on the under layer $a$ or directly on the felly $c$.

The above-described tire is applied around the felly $c$ and fastened thereto in any suitable and practical manner. The felly $c$ can also be specially constructed to receive the steel wires.

What I claim as my invention, and desire to secure to myself by Letters Patent of the United States, is—

In a metal tire for vehicles for ordinary roads, the combination of an under layer $a$ steel wires $b$ attached obliquely to said under layer and resilient peripheral walls $d$ laterally of said under layer and extending outwardly beyond the same to a distance intermediate between the under layer and the outer ends of the wires for the purpose set forth.

In testimony whereof I have signed my name to this specification in the presence of two subscribing witnesses.

ALBERT PEUST.

Witnesses:
 LEONORE RASCH,
 ANNA SIGGEL.